(12) United States Patent
Horth et al.

(10) Patent No.: US 10,483,638 B2
(45) Date of Patent: Nov. 19, 2019

(54) ANTENNA REFLECTOR INTERCHANGE MECHANISM

(71) Applicant: MacDonald, Dettwiler and Associates Corporation, Ste-Anne-de-Bellevue (CA)

(72) Inventors: Richard Horth, Kirkland (CA); Philippe Loiselle, Montreal (CA)

(73) Assignee: MACDONALD, DETTWILER AND ASSOCIATES CORPORATION, Ste-Anne-de-Bellevue, QC (CA)

( * ) Notice: Subject to any disclaimer, the term of this patent is extended or adjusted under 35 U.S.C. 154(b) by 272 days.

(21) Appl. No.: 15/623,764

(22) Filed: Jun. 15, 2017

(65) Prior Publication Data

US 2017/0365922 A1    Dec. 21, 2017

Related U.S. Application Data

(60) Provisional application No. 62/350,527, filed on Jun. 15, 2016.

(51) Int. Cl.
| | |
|---|---|
| *H01Q 3/20* | (2006.01) |
| *F16H 63/38* | (2006.01) |
| *H01Q 19/10* | (2006.01) |
| *H01Q 25/00* | (2006.01) |
| *G05G 5/06* | (2006.01) |
| *H01Q 1/28* | (2006.01) |

(52) U.S. Cl.
CPC ............ *H01Q 3/20* (2013.01); *F16H 63/38* (2013.01); *H01Q 19/10* (2013.01); *H01Q 25/00* (2013.01); *G05G 5/065* (2013.01); *H01Q 1/288* (2013.01)

(58) Field of Classification Search
CPC .......... H01Q 3/20; H01Q 19/10; H01Q 25/00; H01Q 1/288; G05G 5/065; F16H 63/38
USPC ....... 74/471 R, 473.12, 527, 529; 343/781 P, 343/761, 763, 781 CA, 879, 882
See application file for complete search history.

(56) References Cited

U.S. PATENT DOCUMENTS

| | | | |
|---|---|---|---|
| 5,864,320 A * | 1/1999 | Baghdasarian | B64G 1/22 16/335 |
| 7,932,868 B2 | 4/2011 | Legay et al. | |
| 9,065,173 B2 | 6/2015 | Brossier et al. | |

* cited by examiner

*Primary Examiner* — David H Bollinger
(74) *Attorney, Agent, or Firm* — Praxis

(57) ABSTRACT

An interchange mechanism for deploying at least one reflector for reconfiguration of a spacecraft antenna. The interchange mechanism includes a rotary actuator having a fixed section mounted on an antenna structure and a mobile section rotating relative to the fixed section about a rotation axis. At least one carrier supports a reflector and is freely rotatably mounted on the fixed section for rotation about the rotation axis between first and second angular positions. An arm mounted on the mobile section carries a carrier engaging mechanism that successively and releasably engages the at least one carrier and displaces the at least one carrier from the first to the second angular position when the arm and the mobile section rotate in a first direction.

15 Claims, 10 Drawing Sheets

ANTENNA REFLECTOR INTERCHANGE MECHANISM

CROSS REFERENCE TO RELATED APPLICATIONS

This application claims priority of U.S. Provisional Application for Patent No. 62/350,527 filed Jun. 15, 2017, the content of which is incorporated herein by reference in its entirety.

FIELD OF THE INVENTION

The present invention relates to the field of antenna systems, and is more particularly concerned with a reflector interchange mechanism to essentially sequentially deploy and interchange reflectors or sub-reflectors for reconfiguration of the spacecraft antenna.

BACKGROUND OF THE INVENTION

It is well known in the art of spacecraft antennas to have reflector deployment/interchange mechanisms, as in U.S. Pat. No. 7,932,868, in which the mechanism(s) is never discussed, and U.S. Pat. No. 9,065,173 which discloses a rotating shaft carrying four reflectors extending radially and fixedly therefrom and generally equally spaced form each other (i.e. 90 degrees in this case). The latter mechanism is relatively complex and requires a relatively large volume for its operation.

None of these mechanisms discloses in relative details the operation of the displacement of one reflector at a time to allow for the reconfiguration of the antenna, depending on the reflector being used.

Accordingly, there is a need for an improved reflector interchange mechanism.

SUMMARY OF THE INVENTION

It is therefore a general object of the present invention to provide an improved reflector interchange mechanism that could obviate the above-mentioned problems.

An advantage of the present invention is that the reflector interchange mechanism is capable of reconfiguring an antenna by displacing at least one reflector or sub-reflector thereof.

Another advantage of the present invention is that the reflector interchange mechanism is capable of reconfiguring an antenna by successively or sequentially displacing a plurality of reflector or sub-reflector thereof.

A further advantage of the present invention is that the reflector interchange mechanism is relatively simple while allowing excellent alignment and stabilization of the reflectors, especially when in the first stowed configuration.

Still another advantage of the present invention is that the reflector interchange mechanism allows for the unused reflectors to move away from the signal path of the antenna.

Yet another advantage of the present invention is that the reflector interchange mechanism allows for the resetting of any desired configuration of the antenna, at any time.

Yet a further advantage of the present invention is that the reflector interchange mechanism is very compact in the launch configuration.

Yet another advantage of the present invention is that being compact, it is very light.

According to an aspect of the present invention there is provided an interchange mechanism for holding down and interchanging at least one reflector (or sub-reflector) for reconfiguration of an antenna, said interchange mechanism comprising:

a rotary actuator having a fixed section for mounting on a structure of the antenna, and a mobile section rotating relative to the fixed section about a rotation axis;

at least one carrier for supporting the at least one reflector, the at least one carrier freely rotatably mounting on the fixed section for rotation about the rotation axis between a first angular position and a second angular position; and an arm mounted on the mobile section and carrying a carrier engaging mechanism successively and releasably engaging the at least one carrier and displacing the at least one carrier from the first angular position to the second angular position when the arm and the mobile section rotate in a first direction.

In one embodiment, the carrier engaging mechanism being a latching mechanism successively latching to the at least one carrier at the first angular position and unlatching from the at least one carrier at the second angular position.

In one embodiment, the latching mechanism includes a spring-loaded detent ball successively engaging a ball receptacle formed into the at least one carrier.

In one embodiment, a first hard stop mounted on the fixed section ensures that the at least one carrier stops at the second angular position in abutment contact therewith.

Conveniently, the fixed structure includes a carrier positioning mechanism selectively and releasably engaging the at least one carrier when at the second angular position for securing the at least one carrier at the second angular position.

In one embodiment, the carrier engaging mechanism selectively and releasably engaging the at least one carrier and displacing the at least one carrier from the second angular position to the first angular position when the arm and the mobile section rotates into a second direction opposite to the first direction.

In one embodiment, a second hard stop mounted on the fixed section ensures that the at least one carrier stops at the first angular position in abutment contact therewith.

Conveniently, the fixed structure includes a reflector positioning mechanism selectively and releasably engaging the at least one reflector when at the first angular position for securing the at least one reflector and the at least one carrier at the first angular position.

In one embodiment, the at least one carrier includes a plurality of carriers, each one of the plurality of carriers supporting a respective one of the at least one reflectors, the plurality of carriers being successively angularly positioned relative to one another about the rotating axis.

Conveniently, each one of the plurality of carriers is in abutment contact with adjacent ones of the plurality of carriers when being in the first angular position.

Conveniently, each one of the plurality of carriers has at least a following one of the plurality of carriers or a preceding one of the plurality of carriers, each one of said plurality of carriers having a following one of the plurality of carriers including a sequencing mechanism permitting the carrier engaging mechanism to selectively engage to the following one of the plurality of carriers when in contact therewith.

Conveniently, the sequencing mechanism includes an extension substantially circumferentially extending from a preceding one of the plurality of carriers into the ball receptacle formed into a following one of the plurality of carriers so as to prevent the spring-loaded ball of the latching mechanism to selectively engage the ball receptacle formed into a following one of the plurality of carriers.

Conveniently, the fixed section includes a respective first hard stop for each one of the plurality of carriers to be in abutment therewith when at the second angular position thereof, said plurality of carriers being spaced from one another when in the second angular position.

Conveniently, the following one of the plurality of carriers forming the second hard stop for the preceding one of the plurality of carriers at the corresponding first angular position thereof in abutment contact therewith.

In one embodiment, at least one of the carrier positioning mechanism and the reflector positioning mechanism includes a spring-loaded ball detent mechanism.

In accordance with another aspect of the present invention there is provided a spacecraft antenna comprising a deployment mechanism as claimed hereinabove connecting to at least one reflector for reconfiguration of the antenna.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

With reference to the annexed drawings the preferred embodiment of the present invention will be herein described for indicative purpose and by no means as of limitation.

Figure 1A:
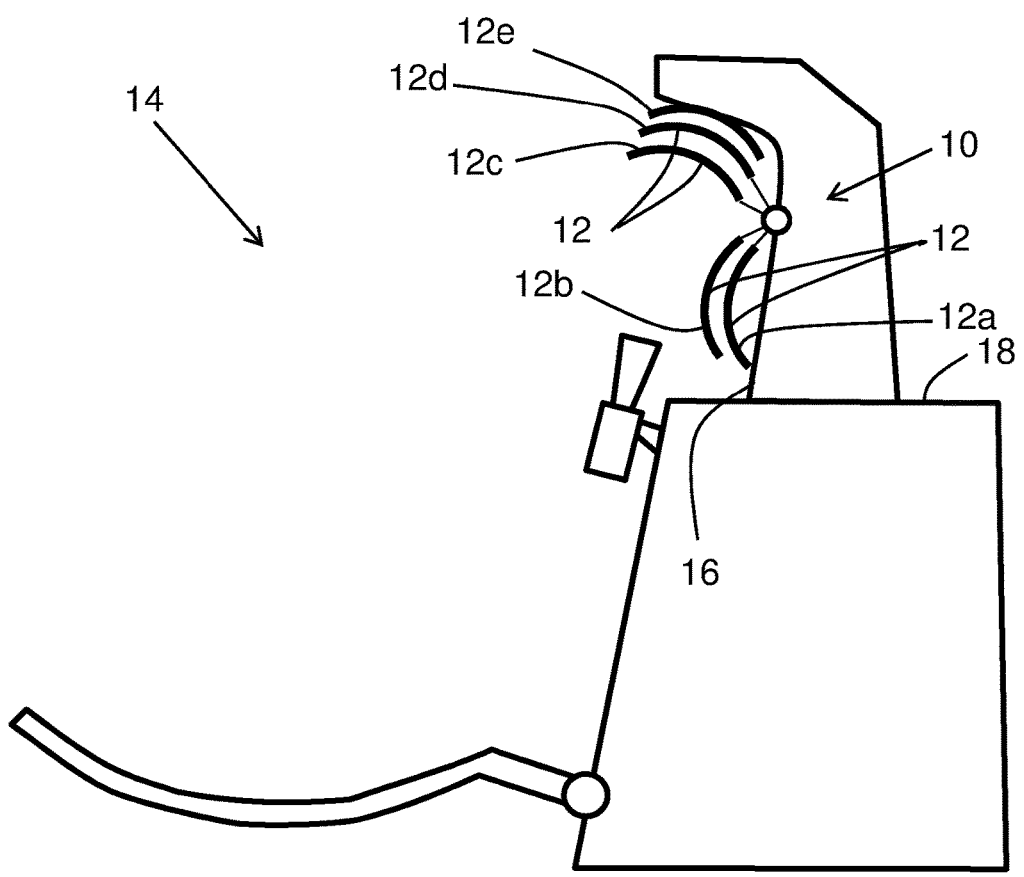
FIGS. 1a and 1b are schematic side and front elevation views of antennas mounted on a spacecraft with a reflector interchange mechanism in accordance with embodiments of the present invention with different orientations, shown connected to a plurality of reflectors positioned between the antenna feed horn and the main reflector.
Figure 1B:
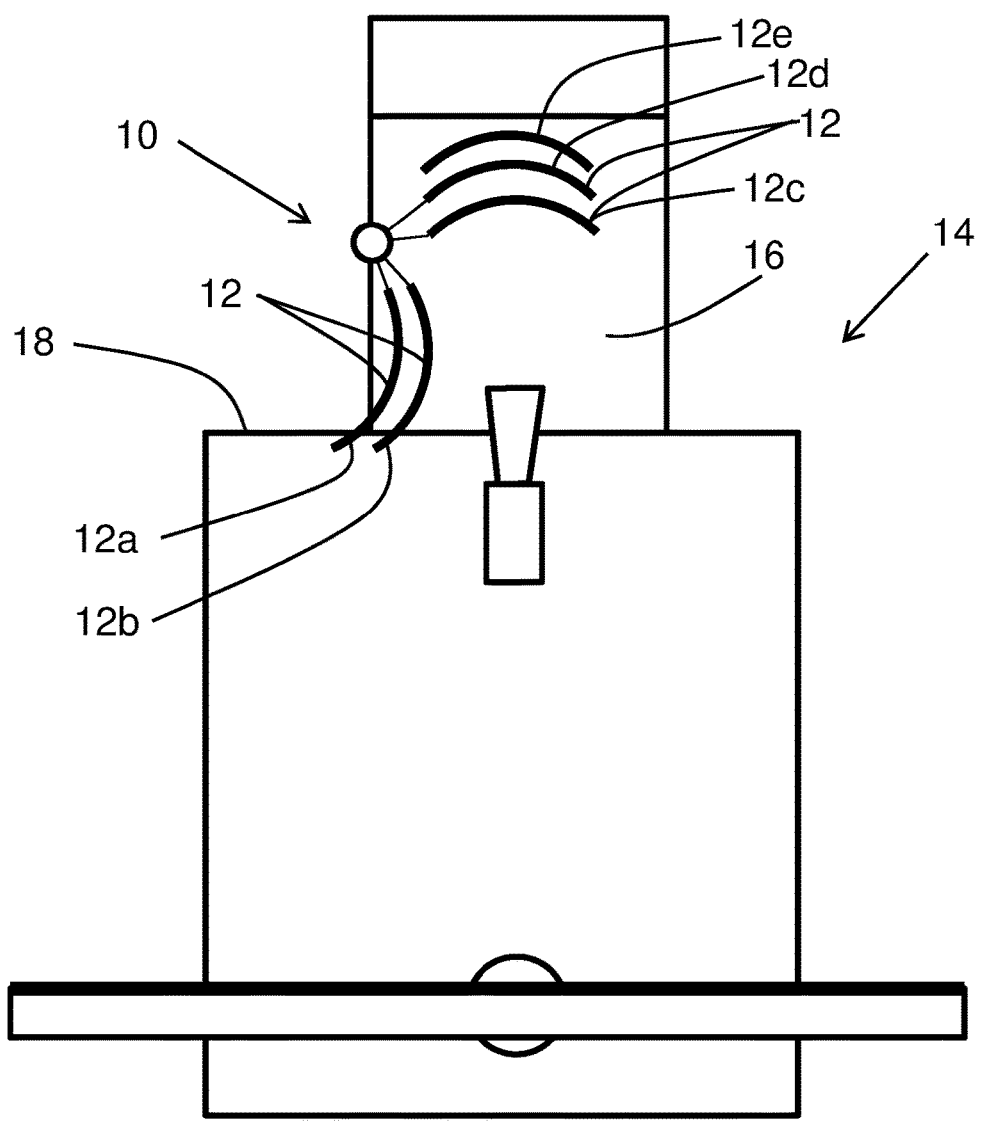
Figure 2:
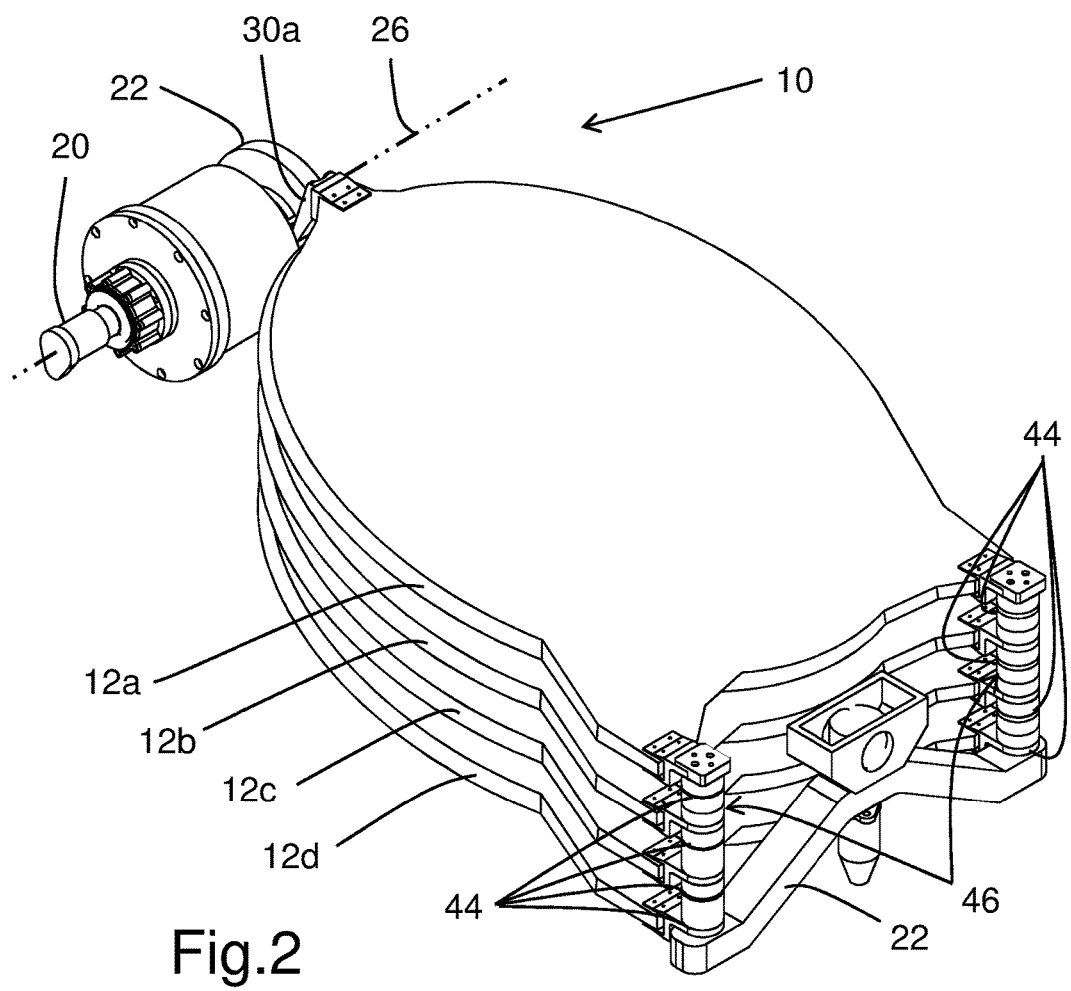
FIG. 2 is a perspective view of a reflector interchange mechanism in accordance with an embodiment of the present invention, showing the reflectors connected thereto, in the first angular (stowed) configuration, and to the hold-down and release mechanism.
Figure 3:
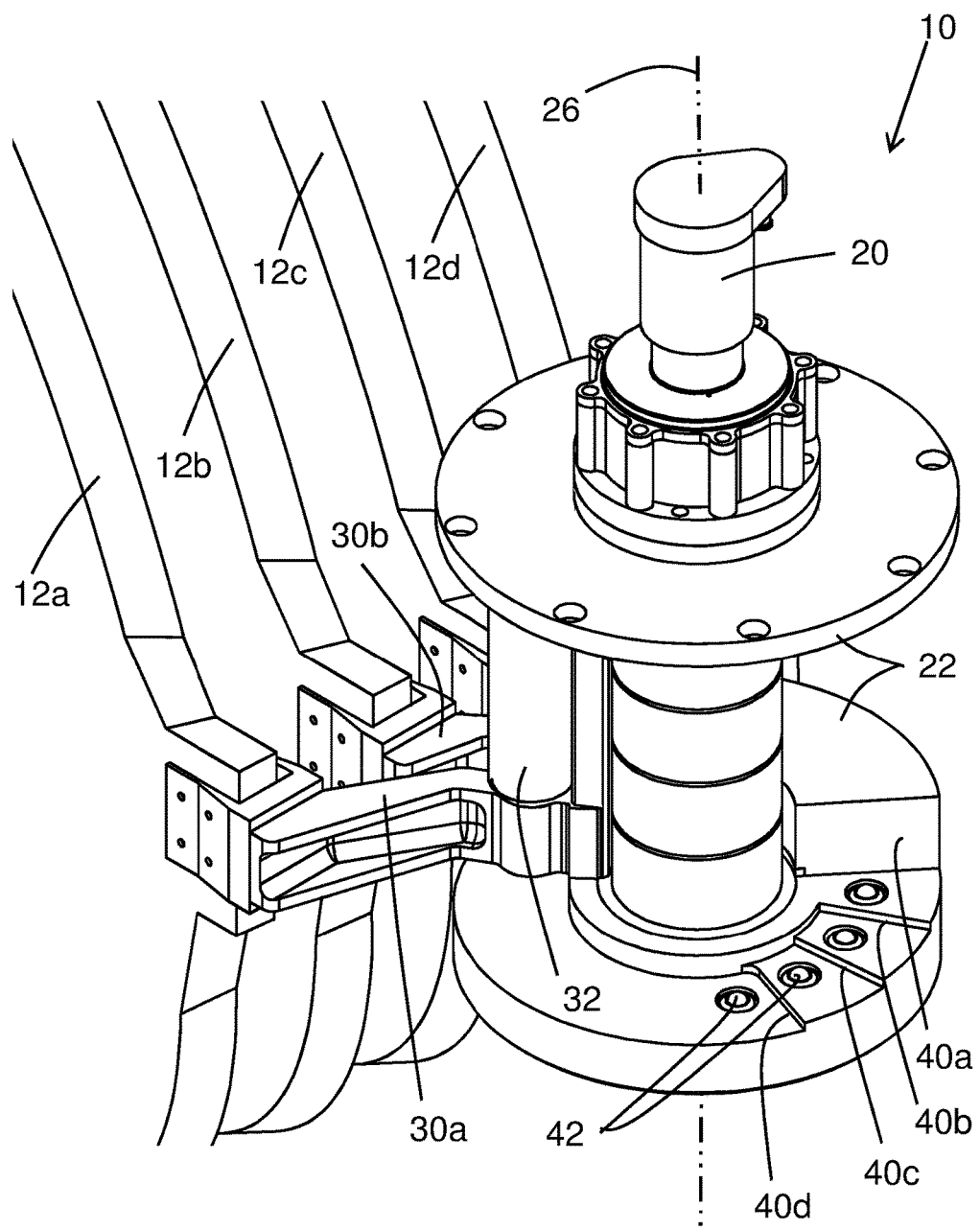
FIG. 3 is a top front perspective view of the embodiment of FIG. 2, shown with the outer housing removed for clarity.
Figure 4:
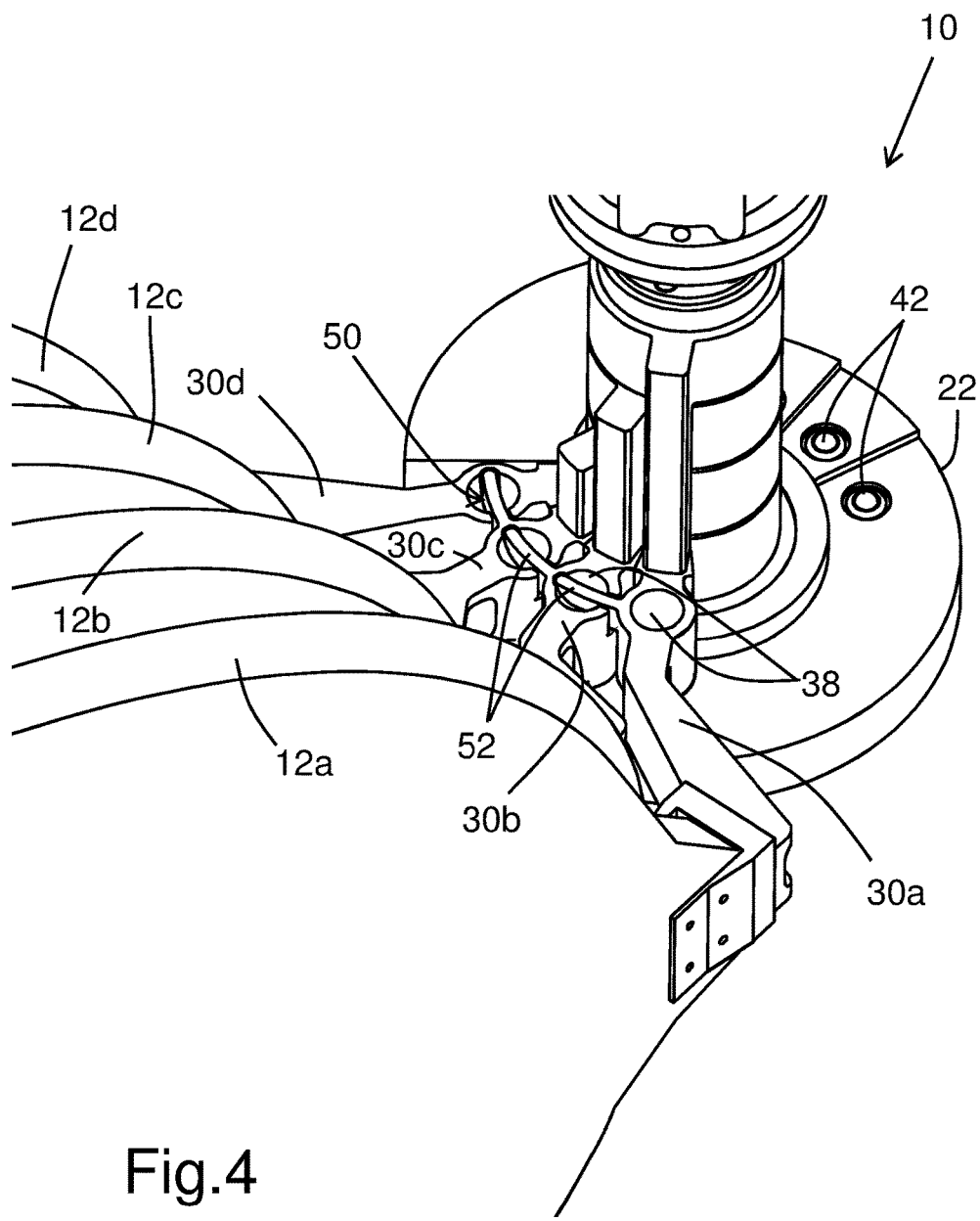
FIG. 4 is a top side perspective view of the embodiment of FIG. 2; showing the carriers in the first angular position.
Figure 5:
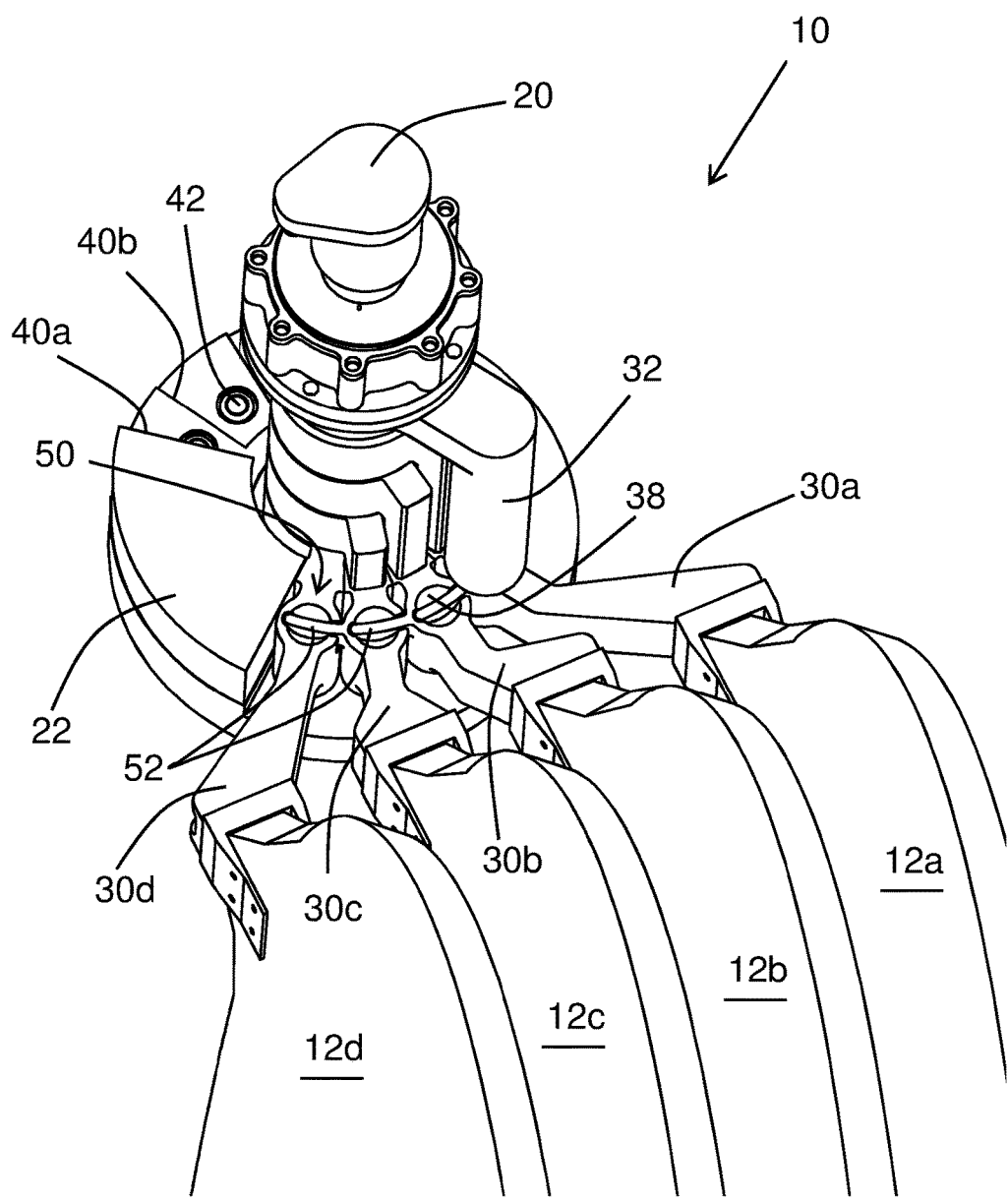
FIG. 5 is a view similar to FIG. 4, showing the arm engaging the carrier of the first reflector.
Figure 6:
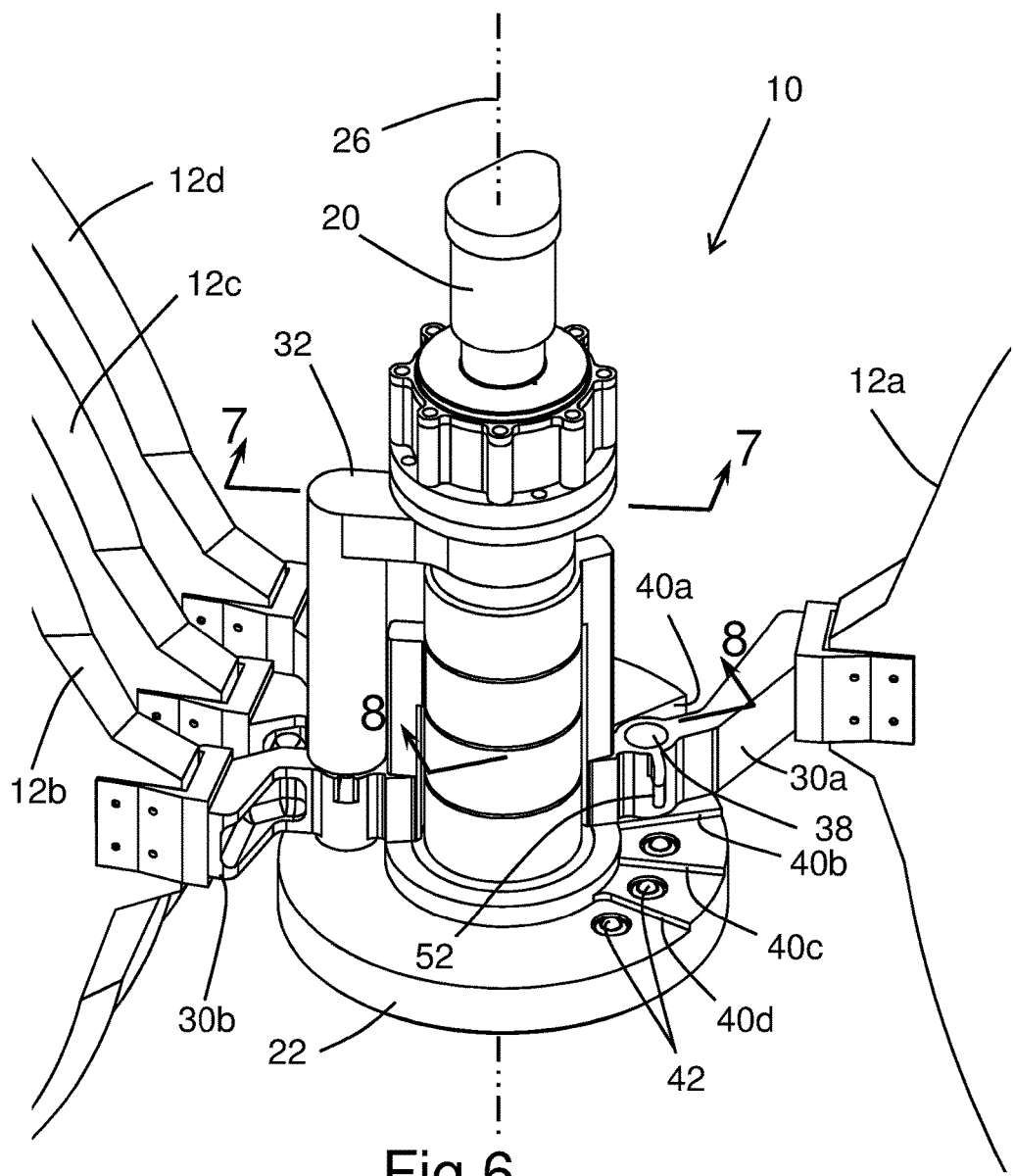
FIG. 6 is a top front perspective view of the embodiment of FIG. 2, showing the arm engaging the second carrier at its first angular position with the first carrier latched in its second angular position.

Referring to FIGS. 1a through 9, there is shown a deployment or interchange mechanism in accordance with an embodiment 10 of the present invention, for deploying at least one, preferably a plurality of reflector (or sub-reflector) 12 for reconfiguration of an antenna 14, especially on an antenna mounted on a spacecraft 18, for the transmission of electromagnetic signals. In FIGS. 1a and 1b, the top or fifth reflector 12e is a fixed reflector not connected to the interchange mechanism 10. Each carrier 30a, 30b, 30c, 30d supports a respective reflector 12a, 12b, 12c, 12d, and the carriers 30 are successively angularly positioned relative to one another about the rotating axis 26. It is noted that, although the embodiment 10 of FIGS. 1a-9 refer to moving sub-reflectors, the term reflector is used throughout the following description since it also applies to reflectors or the like.

Figure 7:
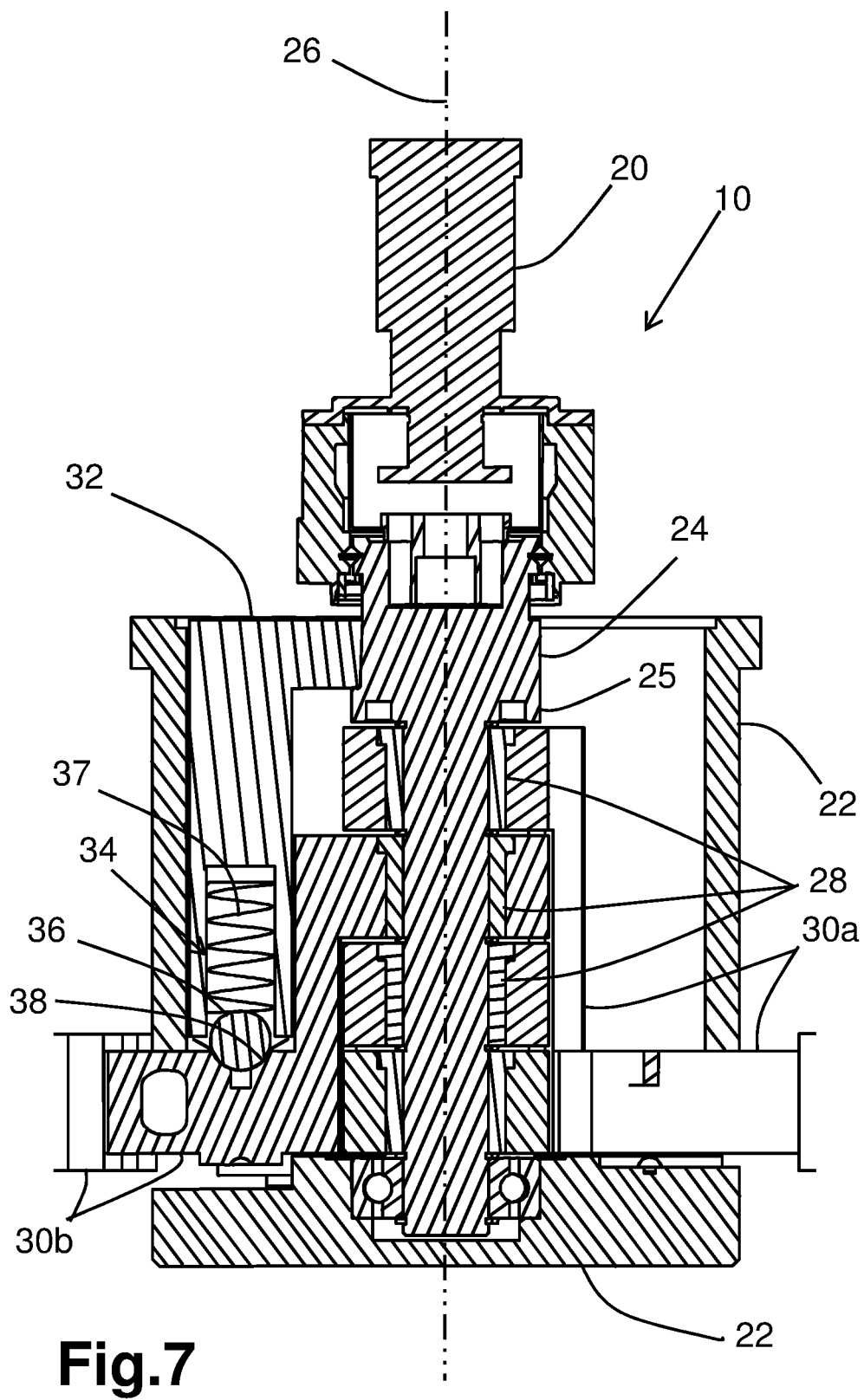
FIG. 7 is a section view taken along line 7-7 of FIG. 6, showing the latching mechanism of the arm.
Figure 8:
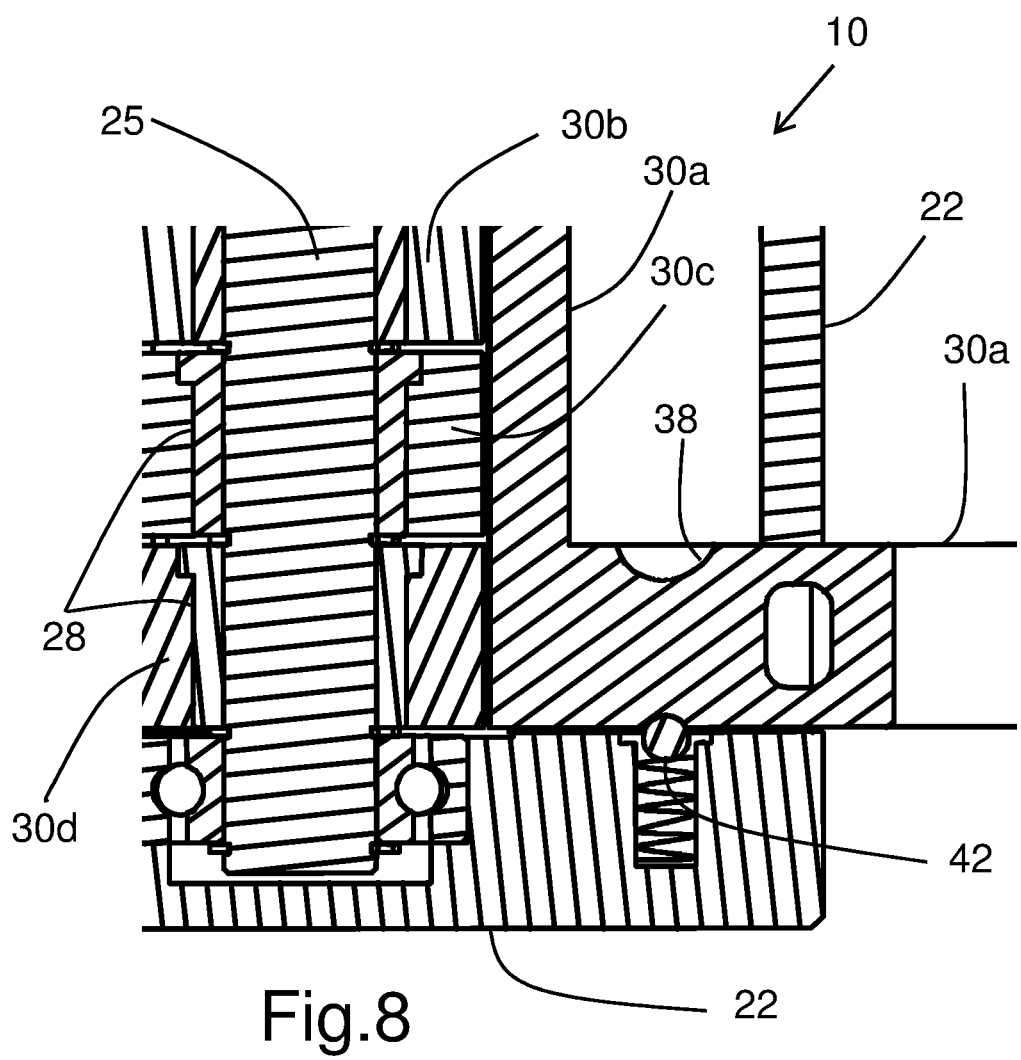
FIG. 8 is a partially broken enlarged section view taken along line 8-8 of FIG. 6, showing the carrier positioning mechanism of the first carrier.
Figure 9:
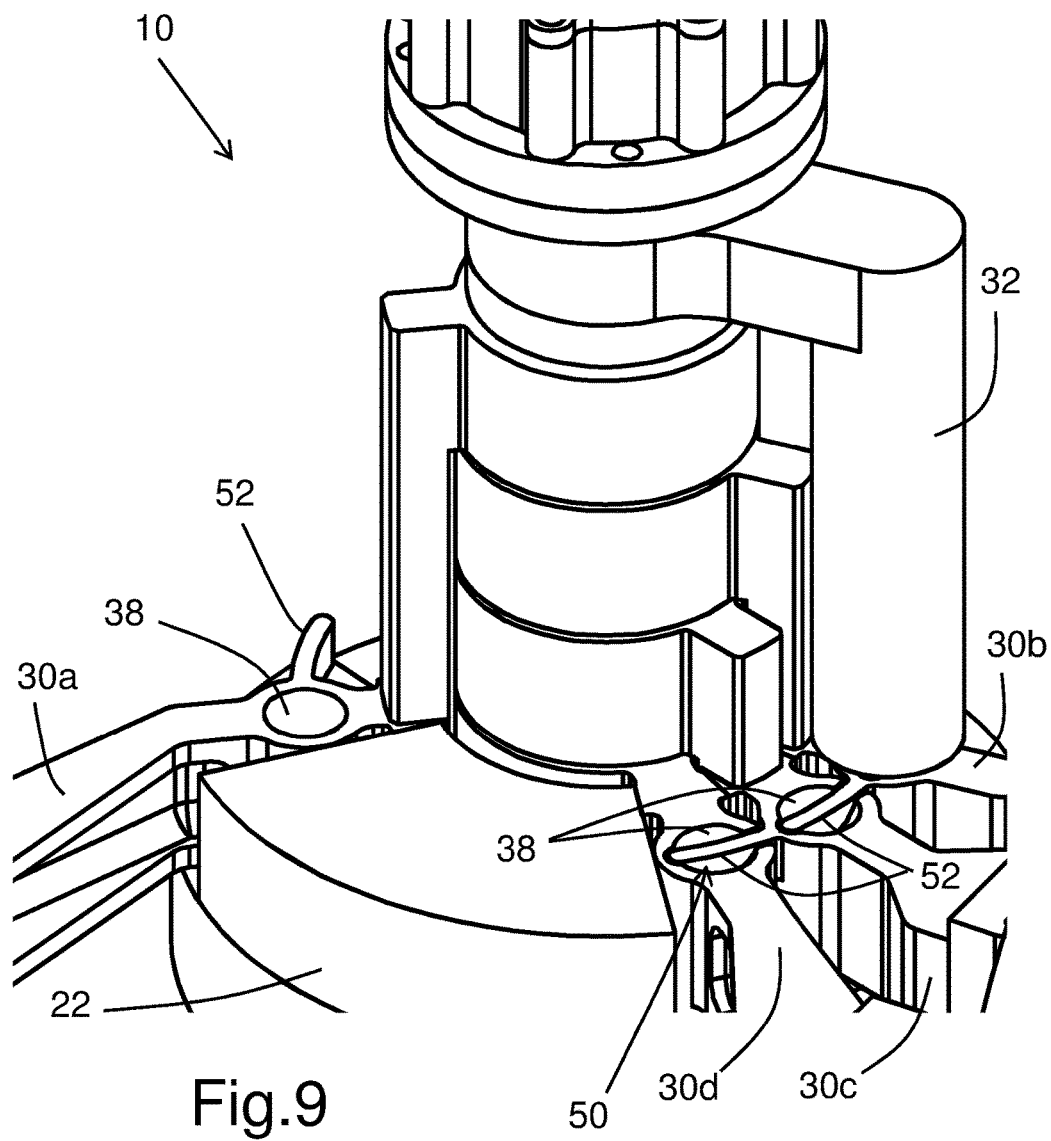
FIG. 9 is a top rear perspective view of the embodiment of FIG. 6.

The interchange mechanism 10 typically includes a rotary actuator or motor 20 having a fixed section 22 for mounting on a structure 16 of the antenna 14, and a mobile section 24, including a shaft 25 or the like, rotating relative to the fixed section 22 about a rotation axis 26. At least one, and typically a plurality of carriers 30 support a respective reflector 12. The carriers are freely rotatably mounted on the shaft 25 via respective bushings 28 or the like for rotation about the rotation axis 26, as shown in FIG. 7. Rotation of each carrier 30 is between a respective stowed first angular position and a respective deployed second angular position.

An arm 32 mounted on the mobile section 24 carries a carrier engaging mechanism 34 that successively and releasably engages the plurality of carriers 30 and displaces them from their first angular positions to their second angular position, when the arm 32 and the mobile section 24 rotate in a first direction.

The carrier engaging mechanism 34 (see FIG. 7) is typically a latching mechanism which successively latches to the carriers 30 at their first angular position and unlatches from the carriers 30 at the second angular position.

Typically, the latching mechanism includes a spring-loaded detent ball 36 successively engaging a corresponding ball receptacle 38 formed into each carrier 30a, 30b, 30c, 30d, under the action of the compression spring 37. A first hard stop 40a located on the fixed section 22 ensures that the first carrier 30a stops at its second angular position in abutment contact therewith. Similarly, the fixed section 22 typically includes a first hard stop 40b, 40c, 40d to receive the respective carrier 30b, 30c, 30d in abutment contact therewith when in their respective second angular position. Furthermore, when in their second angular positions, the carriers 30 are typically spaced from one another.

Typically, the fixed structure 22 includes a carrier positioning mechanism 42 that selectively and releasably engages the plurality of carriers 30 when they are at their respective second angular position for securing and maintaining them at the second angular position.

As the ball receptacle 38 of the first carrier 30a is always free for engagement, the carrier engaging mechanism 34 selectively and releasably engaging the first carrier 30a to successively and then simultaneously displace all the carriers 30 from their second angular position back to their first angular position, when the arm 32 and the mobile section 24 rotates into a second direction opposite to the first direction. To this end, a second hard stop 44 located on the fixed structure 22 ensures that the last reflector 12d stops at the first angular position in abutment contact therewith. Similarly, the last reflector 12d serves as a hard stop for the third reflector 12c, and so on.

Typically, the fixed structure 22 includes a reflector positioning/detent mechanism 46 that selectively and releasably engages the plurality of reflectors 12*d*, 12*c*, 12*b*, 12*a* when they are at their respective first angular position for securing them and the corresponding carriers 30*d*-30*a* at the first angular position. The second hard stop 44 is typically part of or integral with the reflector positioning mechanism 46.

Preferably, when in the first angular position, each carrier 30 is in abutment contact with adjacent carriers 30.

Each carrier 30 that has a following carrier that typically includes a sequencing mechanism 50 to allow or permit the latching mechanism 34 to selectively latch to the following carrier when in contact therewith. The sequencing mechanism 50 typically includes an extension or tab 52 substantially circumferentially extending from the preceding carrier 30 into the ball receptacle 38 formed into the following carrier 30 so as to prevent the spring-loaded ball 36 of the latching mechanism 34 to selectively engage the ball receptacle 38 of the following carrier 30.

The carrier positioning mechanism 42 and/or the reflector positioning mechanism 46 typically includes a spring-loaded ball detent mechanism, similar to the carrier engaging mechanism 34, or any other mechanism such as a magnetic mechanism or the like.

When each reflector 12 is displaced from its first angular position to its second one, the motor 20 is strong enough to overcome the resistive torque generated by the reflector positioning mechanism 46 of the corresponding reflector 12 being displaced. Similarly, when all reflectors 12 are all displaced from their second angular position back to their first one, the motor 20 is strong enough to successively overcome the resistive torque generated by the carrier positioning mechanism 42 of each carrier 30, one at a time, since the carriers 30 are spaced from each other in the second angular position.

The present invention also provides for a spacecraft antenna 14 comprising an interchange mechanism 10 as described hereinabove that connects to at least one, preferably a plurality of reflectors 12 for reconfiguration of the antenna 14.

Although not illustrated, one skilled in the art would readily realize that, without departing from the scope of the present invention, the actuator could be any non-rotary actuator, such as a linear actuator connected to a crank assembly or the like.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinafter claimed.

We claim:

1. An interchange mechanism for deploying at least one reflector for reconfiguration of an antenna, said interchange mechanism comprising:
   a rotary actuator having a fixed section for mounting on a structure of the antenna, and a mobile section rotating relative to the fixed section about a rotation axis;
   at least one carrier for supporting the at least one reflector, the at least one carrier freely rotatably mounting on the fixed section for rotation about the rotation axis between a first angular position and a second angular position; and
   an arm mounted on the mobile section and carrying a carrier engaging mechanism successively and releasably engaging the at least one carrier and displacing the at least one carrier from the first angular position to the second angular position when the arm and the mobile section rotate in a first direction;
   wherein the carrier engaging mechanism is a latching mechanism successively latching to the at least one carrier at the first angular position and unlatching from the at least one carrier at the second angular position.

2. The interchange mechanism of claim 1, wherein the latching mechanism includes a spring-loaded detent ball successively engaging a ball receptacle formed into the at least one carrier.

3. The interchange mechanism of claim 2, wherein a first hard stop mounted on the fixed section ensures that the at least one carrier stops at the second angular position in abutment contact therewith.

4. The interchange mechanism of claim 3, wherein a second hard stop mounted on the fixed section ensures that the at least one carrier stops at the first angular position in abutment contact therewith.

5. The interchange mechanism of claim 2, wherein the at least one carrier includes a plurality of carriers, each one of the plurality of carriers supporting a respective one of the at least one reflectors, the plurality of carriers being successively angularly positioned relative to one another about the rotating axis.

6. The interchange mechanism of claim 5, wherein each one of the plurality of carriers is in abutment contact with adjacent ones of the plurality of carriers when being in the first angular position.

7. The interchange mechanism of claim 5, wherein each one of the plurality of carriers has at least a following one of the plurality of carriers or a preceding one of the plurality of carriers, each one of said plurality of carriers having a following one of the plurality of carriers including a sequencing mechanism permitting the carrier engaging mechanism to selectively engage to the following one of the plurality of carriers when in contact therewith.

8. The interchange mechanism of claim 7, wherein the sequencing mechanism includes an extension substantially circumferentially extending from a preceding one of the plurality of carriers into the ball receptacle formed into a following one of the plurality of carriers so as to prevent the spring-loaded ball of the latching mechanism to selectively engage the ball receptacle formed into a following one of the plurality of carriers.

9. The interchange mechanism of claim 5, wherein the fixed section includes a respective first hard stop for each one of the plurality of carriers to be in abutment therewith when at the second angular position thereof, said plurality of carriers being spaced from one another when in the second angular position.

10. The interchange mechanism of claim 9, wherein the following one of the plurality of carriers forming the second hard stop for the preceding one of the plurality of carriers at the corresponding first angular position thereof in abutment contact therewith.

11. The interchange mechanism of claim 5, wherein at least one of the carrier positioning mechanism and the reflector positioning mechanism includes a spring-loaded ball detent mechanism.

12. The interchange mechanism of claim 1, wherein the fixed structure includes a reflector positioning mechanism selectively and releasably engaging the at least one reflector when at the first angular position for securing the at least one reflector and the at least one carrier at the first angular position.

13. A spacecraft antenna comprising an interchange mechanism as claimed in claim 1 connecting to at least one reflector for reconfiguration of the antenna.

14. An interchange mechanism for deploying at least one reflector for reconfiguration of an antenna, said interchange mechanism comprising:

a rotary actuator having a fixed section for mounting on a structure of the antenna, and a mobile section rotating relative to the fixed section about a rotation axis;

at least one carrier for supporting the at least one reflector, the at least one carrier freely rotatably mounting on the fixed section for rotation about the rotation axis between a first angular position and a second angular position; and an arm mounted on the mobile section and carrying a carrier engaging mechanism successively and releasably engaging the at least one carrier and displacing the at least one carrier from the first angular position to the second angular position when the arm and the mobile section rotate in a first direction;

wherein the fixed structure includes a carrier positioning mechanism selectively and releasably engaging the at least one carrier when at the second angular position for securing the at least one carrier at the second angular position.

15. An interchange mechanism for deploying at least one reflector for reconfiguration of an antenna, said interchange mechanism comprising:

a rotary actuator having a fixed section for mounting on a structure of the antenna, and a mobile section rotating relative to the fixed section about a rotation axis;

at least one carrier for supporting the at least one reflector, the at least one carrier freely rotatably mounting on the fixed section for rotation about the rotation axis between a first angular position and a second angular position; and an arm mounted on the mobile section and carrying a carrier engaging mechanism successively and releasably engaging the at least one carrier and displacing the at least one carrier from the first angular position to the second angular position when the arm and the mobile section rotate in a first direction;

wherein the carrier engaging mechanism selectively and releasably further engages the at least one carrier and displacing the at least one carrier from the second angular position to the first angular position when the arm and the mobile section rotates into a second direction opposite to the first direction.

* * * * *